United States Patent Office 3,152,186
Patented Oct. 6, 1964

3,152,186
PROCESS FOR THE PRODUCTION OF
HEXAMETHYLENEDIAMINE
Charles R. Campbell, Robert Johnson, and Roland R. Spiegelhalter, Pensacola, Fla., assignors to Monsanto Company, a corporation of Delaware
No Drawing. Filed June 24, 1963, Ser. No. 290,190
6 Claims. (Cl. 260—583)

This invention relates to an improved continuous process for the production of hexamethylenediamine, and more particularly, it relates to an improved process for the continuous catalytic hydrogenation of adiponitrile to hexamethylenediamine.

Hexamethylenediamine is now a well known compound which may be prepared continuously on a commercial scale by catalytically hydrogenating adiponitrile in the presence of ammonia. A principal use of hexamethylenediamine involves condensing it with dibasic acids to produce polyamides, and in manufacturing these polyamides, especially those wherein hexamethylenediamine is reacted with adipic acid to produce polyhexamethylene adipamide, important advantages are obtained by reacting the diamine in a first step with an equivalent amount of dibasic carboxylic acid to form a salt using a solvent such as water, methanol, or ethanol in accordance with procedures well known in the art. This salt, thus prepared, is subsequently converted in a second step to the polyamide condensation product.

In the continuous production of hexamethylenediamine by the catalytic hydrogenation of adiponitrile, a high purity adiponitrile is necessary in that even trace impurities present may poison the hydrogenation catalyst and thereby reduce the catalyst activity and shorten markedly its useable service life. Adiponitrile may be produced commercially by a well known process wherein the adiponitrile is synthesized from adipic acid and ammonia in the presence of certain dehydrating catalysts such as the oxides of aluminum, silicon, tungsten, titanium, molybdenum, and the like; and excellent results have been obtained in the synthesis of adiponitrile when the dehydrating catalyst used is a thoroughly dried and dehydrated mixture of boric and phosphoric acids. Unfortunately, a major problem encountered in the commercial manufacture of adiponitrile is that side reactions occur when adipic acid and ammonia are reacted together, and these side reactions result in the formation of various impurities which, if not removed, will have a deleterious effect upon the efficiency, yield, and life of the hydrogenation catalyst in the subsequent hydrogenation of the adiponitrile to hexamethylenediamine as well as causing impurities in the hexamethylenediamine which may have a deleterious effect on the polyamide produced therefrom.

The impurities which may be present in the adiponitrile as a result of side reactions or other means may include such substances as delta-cyanovaleric acid, delta-cyanovaleramide, 1 - cyanocyclopentylidineimine, adipamide, tars, elemental carbon, and other compounds. Before the adiponitrile may be hydrogenated to produce the hexamethylenediamine, it must be separated from these and other impurities which comprise the reaction product from the catalytic dehydrating of adipic acid in the presence of ammonia.

Many purification processes have been proposed and used to remove the impurities from the adiponitrile in the reaction product of its synthesis, and in processes in commercial favor these impurities are removed, of necessity, by complicated steps which combine fractional distillation and chemical treatment. The chemical treatments which have been proposed to remove the impurities include contacting and reacting the impure adiponitrile with acidic permanganate solutions, with hydroxylamine, with a hydrazine, with diisocyanates, and with nitric acid solutions. These and other chemical treatments are commercially unsatisfactory in that they entail the consumption of expensive chemicals and also introduce added aqueous streams into the adiponitrile process which aqueous streams, because of the solubility of adiponitrile therein, must be treated separately to recover the dissolved adiponitrile.

An object of the present invention, therefore, is to provide a continuous process for the production of hexamethylenediamine by the catalytic hydrogenation of high purity adiponitrile whereby higher yields of hexamethylenediamine can be obtained over long periods of time.

Another object of the invention is to provide a continuous purification process for commercially produced adiponitrile whereby the purified adiponitrile may be hydrogenated to hexamethylenediamine in the presence of a suitable hydrogenation catalyst without a loss of catalyst activity and service life because of impurities in the adiponitrile.

A further object of this invention is to provide an improved process for the continuous purification of adiponitrile and the regeneration of the adiponitrile purification process whereby the hexamethylenediamine produced from the highly purified adiponitrile is obtained in a high state of purity not previously obtained.

These and other objects of the invention will become more readily apparent from the following detailed description.

In accordance with this invention it has now been found that extremely high yields of high purity hexamethylenediamine can be obtained by a continuous process which comprises, in combination, the steps of distillation of the crude adiponitrile as produced by conventional processes, the liquid phase treatment of the distilled crude adiponitrile alternately with a cation exchange resin and an anion exchange resin, the regeneration of the cation exchange resin, the regeneration of the anion exchange resin, dehydration and distillation of the ion exchange resin purified adiponitrile, and the subsequent hydrogenation of the distilled ion exchange purified adiponitrile in the presence of a cobalt hydrogenation catalyst at hydrogenation temperatures and pressures.

Crude adiponitrile suitable for use in the process of this invention may be obtained in any manner well known in the art such as the reaction of 1,4-dichlorobutane with sodium cyanide; heating adipamide with acetic anhydride in the presence of cobalt or nickel; chemical reaction of butadiene derived from natural gas or petroleum and by other processes well known in the art. In a preferred example, adiponitrile may be prepared by passing a gaseous mixture of ammonia and adipic acid, at approximately 300° C., over a catalyst comprising a dehydrated mixture of boric and phosphoric acids.

The crude adiponitrile as produced by conventional processes is subject to distillation, either vacuum or other, to produce a semi-refined adiponitrile suitable for further treatment by the continuous process of this invention. The distillation of the crude adiponitrile may be performed in any suitable distillation apparatus well known in the art, and water, ammonia, and a major portion of the by-products of the adiponitrile synthesis are removed thereby.

It has been observed that cyanovaleric acid is one of the principal acidic components in crude adiponitrile as produced by dehydrating adipic acid in the presence of ammonia, and this by-product may be produced in the adiponitrile synthesis as an intermediate product when the dehydration catalyst loses activity. This by-product boils above adiponitrile but nevertheless may distill overhead with the adiponitrile in low concentrations in the production of the semi-refined adiponitrile for use in the process of this invention. Although in the process of this invention there is no upper limit on the concentration of the acidic components in the semi-refined adiponitrile obtained after distillation, as will be seen later in the description of this invention, it is important that the acidic component of the semi-refined adiponitrile be held to the lowest possible level whenever possible to maintain a high throughput of adiponitrile per regeneration of the anion resin exchange bed. Many practices well known in the art may be effected to minimize the production of cyanovaleric acid and other acidic components in the synthesis of crude adiponitrile to prevent the accumulation of this and other impurities in the continuous semi-refining distillation apparatus and to return the acidic by-product components of the crude adiponitrile to the crude adiponitrile synthesis process, not only to benefit subsequent steps in the process of this invention but to improve substantially the yields in the adiponitrile synthesis process.

The semi-refined adiponitrile may be saturated with water at ambient temperatures and filtered to remove extraneous solids, if desired. A slight excess of water may be tolerated in subsequent steps of the process of this invention, however, a two-phase liquid feed stream consisting of water and adiponitrile may reduce the efficiency of subsequent steps of the process. Adiponitrile, not saturated with water, may cause dehydration of the ion exchange resins used in subsequent steps of the process of this invention and dehydration of the ion exchange resins may cause increased breakage of the resin particles during regeneration thereof in other subsequent steps in the continuous process of this invention.

The continuous liquid phase treatment of the semi-refined adiponitrile alternately with a cation exchange resin and an anion exchange resin may be accomplished with a minimum of four ion exchange resin beds arranged with two cation exchange resin beds and two anion exchange resin beds in series with reference to the flow of the semi-refined adiponitrile through the process and with the two cation exchange resin beds and the two anion resin beds each in parallel with each other in reference to the flow of the semi-refined adiponitrile therethrough. Broadly, this arrangement is such that the semi-refined adiponitrile may be fed through a cation exchange resin bed first and then an anion exchange resin bed in series therewith and a second cation exchange resin bed and a second anion resin bed are retained on stand-by or are being subjected to regeneration, as will be described subsequently in this invention. By the process of this invention the semi-refined adiponitrile may be subjected alternately to at least one cation exchange resin bed and one anion exchange resin bed on a continuous basis depending upon flow requirements of the process, the size of the resin beds, and other factors well known to those skilled in the art. Additional ion exchange resin beds for subsequent alternate treatment may be used within the scope of this invention.

The acidic and basic impurities in semi-refined adiponitrile may be removed by the steps in the process of this invention whether they are present in the semi-refined adiponitrile in a free state or in a combined state such as salts. Also, known acidic impurities present in the semi-refined adiponitrile may be hydrolyzed by the cation exchange resin to 2-cyano cyclopentanone which may be readily removed from the adiponitrile in a subsequent distillation step in the process of this invention. Semi-refined adiponitrile containing up to one milliequivalent of basic impurities per 100 milliliters of adiponitrile, present as free bases or acid salts, may be purified effectively by the cation exchange resin treatment step of the process of this invention, and although higher concentrations of basis impurities may not be encountered normally in semi-refined adiponitrile manufactured by presently known processes, higher concentrations may be removed by reducing the volume throughput of adiponitrile per cation exchange resin bed between the regenerations of the cation exchange resin bed.

Semi-refined adiponitrile containing up to seven milliequivalents of free organic acids per 100 milliliters of adiponitrile may be purified effectively by the anion exchange resin treatment step of this invention and higher concentrations of acidic impurities may be removed also by reducing the volume throughput of adiponitrile in the anion exchange resin bed between regeneration steps of the resin bed. The volume throughput of semi-refined adiponitrile between regenerations of the anion exchange bed may be increased by pretreatment of the semi-refined adiponitrile, prior to the cation exchange resin and anion exchange resin purification steps of this invention, by washing the semirefined adiponitrile with aqueous caustic solution or aqueous acid solution; however, these additional steps have not been found necessary and such pretreatment will not have a favorable effect on the economics of the process disclosed herein.

The cation exchange resin used in the cation exchange resin bed treatment may be any strongly acidic type such as the free acid of a sulphonated styrene divinylbenzene copolymer. In a preferred example the cation exchange resin may be one or more of those sold under the trademarks Dowex 50W (Dow Chemical Company). IR–120 and Amberlite 200 (Rohm and Haas Company), and Permutit Q (Permutit Company).

The anion exchange resin suitable for the practice of the anion exchange resin purification step of the process of this invention may be a strongly basic anion exchanger of the quaternary ammonium hydroxide type as for example a styrene divinylbenzene copolymer with quaternary ammonium hydroxide groups on side chains of the aromatic nuclei. In a preferred example the anion exchange resin may be one or more of those sold under the trademarks Dowex 2 and Dow 21K (Dow Chemical Company), IRA–401 (Rohm and Haas Company), and Permutit S1 and Permutit S2 (Permutit Company).

Other commercially available cation and anion exchange resins of the type described above may be suitable for the practice of the steps of the process of this invention dependent upon the physical strength and the defouling and regenerating characteristics of the particular cation or anion exchange resin used.

The semi-refined adiponitrile fed to the cation and anion exchange beds normally may be down-flow and the flow of semi-refined adiponitrile may be initiated on the top of a column of ion exchange resin which is flooded with water. The water in the column covering the ion exchange resin bed may be displaced downward and replaced with the semi-refined adiponitrile to be purified by this step in the invention. The flow of semi-refined adiponitrile through the cation and anion exchange resin beds is continuous and may be varied dependent upon the depth and cross-sectional area of the ion exchange resin bed. In a preferred example, it has been found in the alternate ion exchange purification of semi-refined adiponitrile obtained from dehydrating adipic acid in the presence of ammonia, that the flow of semi-refined adiponitrile may be at a rate up to ten gallons of semi-refined adiponitrile per minute per square foot of cross sectional area of the ion exchange resin beds without exhausting the effectiveness of the cation and anion exchange resin beds at an unreasonably high rate. Higher flow rates may be used, if desired, provided sufficient ion exchange resin beds are provided to permit contnuous flow of the adiponitrile therethrough while exhausted exchange beds are being regenerated.

The cation exchange resin bed exhaustion rate may vary dependent upon the concentration of the basic impurities contained in the semi-refined adiponitrile and the flow rate thereof through the cation exchange resin bed. In a preferred example of semi-refined adiponitrile prepared from the dehydrogenation of adipic acid in the presence of ammonia, it has been found that the purification effectiveness of the cation exchange resin may be reduced sufficiently to require the regeneration of the bed when there has been a volume throughput of adiponitrile of at least 40 to 50 times the volume of the cation exchange resin in the bed.

The anion exchange resin bed exhaustion rate may vary also, depending upon the concentration of the acidic impurities contained in the semi-refined adiponitrile and the flow rate thereof through the anion exchange bed. In a preferred example of semi-refined adiponitrile prepared from the dehydrogenation of adipic acid in the presence of ammonia, it has been found that the purification effectiveness of the anion exchange resin in a bed may be reduced sufficiently to require the regeneration of the bed when there has been a volume throughput of adiponitrile of at least 12 to 20 times the volume of the anion exchange resin in the bed.

The operating temperature for contacting the semi-refined adiponitrile with the cation and anion exchange resins in the ion exchange beds may be varied from 20° C. to 50° C.; however, operation of either bed at elevated or lowered temperatures does not improve the ion exchange efficiency to any great extent and may be undesirable because of the lower stability of anion exchange resins above 50° C.

Cation exchange resin exhaustion may be monitored by any suitable means such as ultraviolet light scanning of the effluent semi-refined adiponitrile from the cation exchange resin column; and when continuous or intermittent ultraviolet light scanning is used, the ultraviolet light may have a wave length of 220 to 280 millimicrons and preferably 250 to 270 millimicrons. When ultraviolet light is used for monitoring, the feed of the semi-refined adiponitrile may be changed from the exhausted cation exchange resin column to a second exchange resin column operating in parallel therewith, when the ultraviolet light absorption of the effluent is found to have increased approximately two-fold.

The exhausted cation exchange resin column then may be treated according to the cation exchange resin regeneration step of this invention, which comprises displacing the semi-refined adiponitrile in the exhausted cation exchange resin column, reclassification, defouling, and water washing of the cation exchange resin bed, regeneration of the water washed cation exchange resin, water wash of the regenerated cation exchange resin, and a final reclassification of the cation exchange resin bed.

The displacement of the semi-refined adiponitrile in the exhausted cation exchange resin column may be accomplished with water. The flow of the displacing water may be concurrent or countercurrent to the normal flow of the semi-refined adiponitrile therethrough. The volume of water used for proper displacement and the rate of flow of the displacing water are not critical; and in a preferred example, water in a volume equal to 1.5 to 2 times the volume of the cation exchange resin in the column may be passed concurrently through the column at a flow rate of two to three gallons per minute per square foot of cross-sectional area of cation exchange resin in the column.

The reclassification of the cation exchange resin bed may be accomplished with water flowing up through the bed and should be continued until there is approximately 100% expansion in the ion exchange resin bed. One or more volumes of water per volume of cation exchange resin may be necessary to accomplish this.

Defouling of the cation exchange resin may be accomplished with a methanol solution of an organic base, an aqueous ammonia solution, or an aqueous ammonia in methanol solution. The concentration of the organic base in the methanol or the ammonia in water or water and methanol may be between 1.5% and 3%, and the flow of the defouling solution may be countercurrent to the normal flow of the semi-refined adiponitrile through the bed at a rate sufficient to remove defouled suspended solids from the cation exchange resin bed and column. In a preferred example, a 1.7% by weight aqueous ammonia solution in a volume three to five times the volume of the cation exchange resin in the bed may be passed countercurrently up through the bed at a rate of 1.5 to 2.5 gallons per minute per square foot of cross-sectional area of resin in the bed. The water wash following defouling may be in the same volume, direction, and flow rate as that of the defouling solution.

The regeneration of the cation exchange resin may be accomplished using an equeous solution of a mineral acid, and the volume of the regenerating solution necessary is dependent upon the concentration of the mineral acid in the aqueous solution. The concentration of the mineral acid in the aqueous solution may be from 4% to 10% by weight. Mineral acid solutions of a concentration less than 4% may be used; however, these solutions may require contacting of the bed with excessive volumes of regeneration solutions; and if mineral acid solutions of a concentration greater than 10% are used, unnecessary cation exchange resin breakage may result. In a preferred example, an aqueous solution of sulfuric acid, in a concentration of 5% by weight, in a volume eight to ten times the volume of the cation exchange resin in the bed may be passed through the bed concurrent to the normal direction of flow of the semi-refined adiponitrile therethrough at a flow rate rate of two to three gallons per minute per square foot of cross-sectional area of the cation exchange resin in the bed. Following contacting of the cation exchange resin bed with regenerating solution, the resin bed may be washed with water in a volume, flow direction, and flow rate substantially the same as that used for the regenerating solution.

A final reclassification of the cation exchange resin in the bed may be accomplished by passing water countercurrently up through the bed in a sufficient volume to provide hydraulic classification of the ion exchange resin. Following the reclassification of the bed, the reclassification water may remain in the bed until such time as it is necessary to use the bed for the cation exchange resin purification of the semi-refined adiponitrile, as described above.

The anion exchange resin exhaustion may be monitored by continuous acidity measurements of the adiponitrile effluent from the anion exchange resin column; and when conductivity, titration, or other acidity measurements show the presence of acid or acids in the effluent, the feed of the semi-refined adiponitrile may be changed from the exhausted anion exchange resin column to a second anion exchange resin column operating in parallel therewith. The exhausted resin column then may be treated according to the anion exchange resin regeneration step of this invention which comprises displacing the semi-refined adiponitrile in the exhausted anion exchange resin column, reclassification, defouling, and water washing of the anion exchange resin bed, regeneration of the water washed anion exchange resin, water wash of the regenerated anion exchange resin, and a final reclassification of the anion exchange resin bed.

The displacement of the semi-refined adiponitrile in the exhausted anion exchange resin column may be accomplished with water. The flow of the displacing water may be concurrent or countercurrent to the normal flow of the semi-refined adiponitrile therethrough. The volume of water used for proper displacement and the rate of flow of the displaced water are not critical; and in a preferred example, water in a volume equal to 1.5 to 2 times the volume of the anion exchange resin in the column may be passed concurrently through the column at a flow rate of two to three gallons per minute per square foot of cross-sectional area of anion exchange resin in the column.

The reclassification of the anion exchange resin bed may be accomplished with water flowing countercurrent to the normal flow of the semi-refined adiponitrile through the bed and should be continued until there is approximately 100% expansion in the ion exchange resin bed. One or more volumes of water per volume of anion exchange resin may be necessary to accomplish this.

Defouling of the anion exchange resin may be accomplished with an aqueous solution of a mineral acid such as hydrochloric, sulfuric, nitric, and others, and the concentration of the mineral acid in the water may be between 2.5% and 10%. The flow of the defouling solution may be countercurrent or concurrent to the normal flow of the semi-refined adiponitrile through the bed at a rate sufficient to remove defouled suspended solids from the anion exchange resin bed and column. In a preferred example, a 2.5% by weight aqueous sulfuric acid solution, in a volume of 0.75 to 1.0 times the volume of the anion exchange resin in the bed, may be passed down through the bed at a rate of 1.5 to 2.5 gallons per minute per square foot of cross-sectional area of resin in the bed. The water wash following defouling may be in the same volume, direction, and flow rate as that of the defouling solution.

Defouling of the anion exchange resin may be preceded by a salt treatment, if desired, to minimize the physical breakage of the anion exchange resin which may result from osmotic shock. This salt treatment may be by contacting the anion exchange resin with a solution of any acidic or neutral salt such as sodium sulfate, ammonium sulfate, sodium chloride, and others; and the concentration of the salt solution and the quantity of salt used to contact the anion exchange resin are dependent upon the theoretical capacity of the anion exchange resin used. In a preferred example, an aqueous solution of ammonium sulfate in a concentration of 1 N and in a sufficient quantity to provide the stoichiometric salt equivalent to the theoretical capacity of the quantity of anion exchange resin in the resin bed may be used.

Regeneration of the anion exchange resin may be accomplished using an aqueous solution of a caustic material such as sodium hydroxide, potassium hydroxide, and other similar materials, and the volume of the regenerating solution necessary is dependent upon the concentration of the caustic in the aqueous solution. The concentration of caustic in the aqueous solution may be from 4% to 10% by weight, however, caustic solutions of less than 4% and greater than 10% may be used, if desired. If caustic solutions of a concentration less than 4% are used, excessive volumes of regenerating solution may be necessary to provide proper regeneration of the anion exchange resin and if the concentration of the caustic solution is greater than 10%, unnecessary anion exchange resin breakage may result. In a preferred example, an aqueous solution of sodium hydroxide in a concentration of 5% by weight and in a volume of seven to ten times the volume of the anion exchange resin the bed may be passed through the bed concurrent to the direction of the normal flow of the semi-refined adiponitrile therethrough at a flow rate of two to three gallons per minute per square foot of cross-sectional area of the anion exchange resin in the bed. Following contacting of the anion resin bed with regenerating solution, the resin bed may be washed with water in a volume, flow direction, and flow rate substantially the same as that used for the regenerating solution.

A final reclassification of the anion exchange resin in the bed is accomplished by passing water up through the bed in a sufficient volume to provide hydraulic classification of the anion exchange resin. Following the reclassification of the bed, the reclassification water may remain covering the bed until such time as it is necessary to use the bed for the anion exchange resin purification of the semi-refined adiponitrile, as described above.

The dehydration and distillation of the ion exchange resin purified adiponitrile may be accomplished by any single or combined dehydration and distillation apparatus well known in the art for the final purification of the adiponitrile prior to the hydrogenation thereof to produce hexamethylenediamine. The ion exchange resin purified adiponitrile may be heated in any suitable container at a temperature above the boiling point of water until the water is removed therefrom and then fractionally distilled at reduced pressure in a suitable distillation apparatus. Dehydration and distillation may be accomplished simultaneously on a continuous basis in a continuous distillation apparatus under conditions of temperature and pressure well known to those skilled in the art. In a preferred example, the dehydration may be accomplished at atmospheric pressure by heating the purified adiponitrile at a temperature between 175° C. and 205° C. for a period of time sufficient to remove the water therefrom. Following this, the dehydrated adiponitrile may be distilled in a continuous distillation apparatus at a pressure between 10 and 20 millimeters of mercury. The main fraction of the adiponitrile obtained from the distillation is that which is used by the process of this invention for the subsequent hydrogenation step, and that higher boiling material which remains from the distillation may be removed and recycled to the distillation apparatus used to prepare the semi-refined adiponitrile, if desired.

The ion exchange purified adiponitrile may be subjected directly to the hydrogenation step following the distillation thereof, and the hydrogenation of the ion exchange resin purified and distilled adiponitrile may be accomplished under controlled conditions of temperature and pressure in the presence of ammonia, hydrogen, a suitable hydrogenation catalyst, and any by-product suppressant compound, if desired. In the practice of the process of this invention, it is preferred generally to carry out the hydrogenation at the lowest temperature and hydrogen pressure at which hydrogen is absorbed at a reasonably rapid rate. In a preferred example, the hydrogenation temperature may be between 120° C. and 170° C. and the hydrogen pressure may be between 4,000 and 6,000 pounds per square inch.

Liquid ammonia may be added to the hydrogenation process to absorb exothermic heat of reaction in the hydrogenation of adiponitrile to hexamethylenediamine and to limit the formation of unwanted by-products. Other by-product suppressant compounds such as organic and inorganic carbonates and carbamates and carbon dioxide may be used, if desired.

The hydrogenation catalyst used may be one or more of the large group of hydrogenating materials such as nickel, cobalt, copper, zinc, platinum, palladium, rubidium, and ruthenium; and these materials, either in the form of free metals or in the form of compounds such as oxides or salts, may be employed alone or in conjunction with known catalyst promotors and supporting materials. In a preferred example, unsupported reduced sintered cobalt catalyst in the form of pellets may be used for the hydrogenation.

The hydrogenation step of the process of this invention may be performed on a continuous basis; and the contacting of the hydrogenation reactants, heat transfer compounds, and by-product suppressants, if any, with the hydrogenation catalyst and with each other may be in the liquid phase, vapor phase, or a combination thereof. In a preferred example, it has been found advantageous to mix adiponitrile and ammonia and by-product suppressant compounds, if any, prior to their contacting with the hydrogen and the catalyst.

The following examples together with comparative test results shown therein illustrate a preferred procedure to be followed in accordance with the continuous process of this invention, however, it should be understood that the examples are illustrative only and not exclusive.

EXAMPLE I

Semi-refined adiponitrile saturated with water at ambient temperature was purified by passing it alternately through an ion exchange resin treatment train consisting of two beds of a hydrogen form of a strongly acidic cation exchange resin and two beds of the hydroxyl form of a strongly basic anion exchange resin arranged alternately in series. The semi-refined adiponitrile was contacted first with the strongly acidic cation exchange resin (Amberlite 200 sold by Rohm and Haas Company) and then with the strongly basic anion exchange resin (Dowex 2 sold by Dow Chemical Company). The ion exchange resin purified adiponitrile was then dehydrated at 205° C. at atmospheric pressure, and the dehydrated adiponitrile was fractionally distilled at ten millimeters of mercury using a continuous distillation apparatus.. A first cut from the distillation apparatus, equal to 8% of the adiponitrile feed to the continuous distillation apparatus, was taken with the apparatus operating at a 2:1 reflux ratio to separate low boiling material from the adiponitrile. A second overhead cut equal to 77% of the feed to the continuous distillation apparatus was then taken, with the apparatus operating at a 1:1 reflux ratio, to permit the separation of the adiponitrile from any remaining high boiling impurities.

A substantially identical sample of semi-refined adiponitrile as that subjected to the ion exchange treatment above was subjected to a substantially identical distillation using the same continuous distillation apparatus and procedure as described above. A comparison of the analytical results of the semi-refined adiponitrile subjected to fractional distillation only and semi-refined adiponitrile subjected to ion exchange treatment and fractional distillation by the process of this invention is shown in Table 1 below.

Table 1
COMPARISON OF ANALYTICAL RESULTS

| | Semi-refined Adiponitrile | |
|---|---|---|
| | Fractionally Distilled Only | Purified and Fractionally Distilled |
| Acidity, meq./100 ml | 1.9 | 0.05 |
| Permanganate Demand, percent | 0.65 | 0.25 |
| APHA Color [1] | 99 | 20 |
| Freeze Point, ° C. (ccm.) | 2.20 | 2.0 |
| Cyanovaleramide, percent | 0.03 | 0.04 |
| 2-Cyanocyclopentyledineimine, percent | 0.132 | 0.01 |
| 2-Cyanocyclopentanone, percent | 0.00 | 0.00 |
| Cyanovaleric Acid, percent | 0.28 | 0.00 |

[1] American Public Health Association color.

The adiponitrile products, the analyses of which are shown in Table 1 above, were hydrogenated on a continuous basis to hexamethylenediamine under substantially identical conditions of temperature and pressure in the presence of an excess of liquid ammonia and a pelleted reduced sintered cobalt oxide hydrogenation catalyst, and it was found that the yield of hexamethylenediamine from the hydrogenation remained at a desired high level for a period of time 240% longer in the process using the ion exchange purified adiponitrile than in the process using adiponitrile which had been fractionally distilled only.

EXAMPLE II

A cation exchange resin bed 2" in diameter and 30" deep and containing 1640 milliliters of IR-120 cation exchange resin (IR-120 is the trademark of Rohm and Haas Company for a strongly acidic cation exchange resin) was subjected to ten repetitive semi-refined adiponitrile purification cycles and ten corresponding regeneration cycles. The purification of the adiponitrile through the cation exchange resin bed was terminated when a twofold increase in the ultraviolet absorption of the cation exchange purified adiponitrile effluent was obtained. The regeneration of the cation exchange resin bed was accomplished using 4.3 volumes of 10% by weight sulfuric acid solution per volume of resin in the bed. The ion exchange purification capacity of the bed for the semi-refined adiponitrile decreased from an initial cycle of 85 volumes of adiponitrile purified per volume of cation exchange resin to 47 volumes of adiponitrile purified per volume of resin for the tenth purification cycle. This corresponds to a 56.5% reduction in the cation exchange resin purification capacity.

EXAMPLE III

A cation exchange resin bed 1.8" in diameter and 30" deep containing 1300 milliliters of IR-120 cation exchange resin (IR-120 is the trademark of Rohm and Haas Company for a strongly acidic cation exchange resin manufactured by them) was subjected to 45 repetitive adiponitrile purification and regeneration cycles. As in Example II, the purification cycles for the adiponitrile were terminated when there appeared a two-fold increase in the ultraviolet absorption of the cation exchange purified adiponitrile effluent from the bed. The regeneration cycle of the cation exchange resin in this example included a defouling step of the cation exchange resin with sulfuric acid solution prior to regeneration. The defouling step was accomplished by contacting the cation exchange resin with four volumes of 1 N aqueous ammonia solution (1.7% by weight) per volume of cation exchange resin in the bed. The defouling solution was contacted with the cation exchange resin countercurrent to the normal direction of the semi-refined adiponitrile through the bed and was followed by a water wash of the bed in substantially the same volume, direction, and flow rate as that of the defouling solution. The regeneration of the bed was accomplished using 8.5 volumes of a 5% by weight sulfuric acid solution per volume of resin in the bed. The capacity of the cation exchange resin bed to purify adiponitrile decreased from 60 volumes of adiponitrile purified per volume of cation exchange resin for the first purification cycle to 45 volumes of adiponitrile purified per volume of resin the bed for the forty-fifth cycle. This reduction capacity is equal to a 25% loss in adiponitrile purification capacity for 45 cycles.

A comparison of the results of Example II and Example III shows clearly the advantage of the defouling cycle in the regeneration of the cation exchange resin for the purification of semi-refined adiponitrile. The adiponitrile purification capacity decrease incurred in the regeneration and defouling of the cation exchange bed through 45 cycles was less than half the loss in adiponitrile purification capacity encountered without defouling in the regeneration step in only ten cycles of regeneration.

EXAMPLE IV

An anion exchange resin bed 1.8" in diameter and 30" deep and containing 1300 milliliters of IRA-401 (trademark of Rohm and Haas Company for a strongly basic anion exchange resin) was used for the purification of cation exchange purified adiponitrile having an acidity of 1.9 milliequivalents per 100 millimeters. On the initial purification cycle with the anion exchange resin bed, 62.5 volumes of adiponitrile per volume of anion exchange resin were purified before acidity appeared in the adiponitrile effluent from the bed. The anion exchange bed was then regenerated by contacting the bed with 2.3 volumes of 10% by weight sodium hydroxide solution per volume of anion exchange resin the bed. The bed was then used for the purification of adiponitrile having the same acidity as before, and acidity appeared in the effluent adiponitrile from the bed after contacting the resin bed with 35 volumes of adiponitrile per volume of resin in the bed. This loss in purification capacity of the anion exchange bed was equal to 44%. Following this purification cycle the anion exchange resin bed was defouled by contacting the bed with 3.1 volumes of a 1 N ammonium sulfate solution per volume of anion exchange resin in the bed, and then 3.1 volumes of 10% by weight sulfuric acid solution. The ammonium sulfate solution and the sulfuric acid solutions were contacted with the resin bed in a flow direction the same as to the normal flow of the adiponitrile therethrough, and following contact with these solutions, the bed was washed with water in a similar volume and flow direction. The ion exchange resin bed was then regenerated in a manner identical to that of the regeneration used previously. Following the regeneration, 67 volumes of adiponitrile, having the same acidity content as before, per volume of anion exchange resin were purified with the bed before acidity appeared in the bed effluent adiponitrile.

The return of the anion exchange resin purification capacity to that equal to or slightly greater than the initial purification capacity of the bed clearly demonstrates the need for a defouling step in the anion resin regeneration step of the invention.

The advantages of the process of this invention are clear. Yields of hexamethylenediamine are improved and maintained at improved levels for longer periods of time without loss in catalyst activity when ion exchange purified adiponitrile is hydrogenated in the presence of cobalt catalysts. High purity adiponitrile for the hydrogenation process is obtained without the use of expensive chemicals which become consumed. Ion exchange resins when used in accordance with the process of this invention may be regenerated simply and economically and used repeatedly. Further, the need for processing and reprocessing aqueous streams introduced when adiponitrile is purified by chemical treatments well known in the art and the attending losses of adiponitrile due to incomplete recovery from introduced aqueous streams and the destructive action of chemical treatments are eliminated.

As many apparently widely different embodiments of this invention may be made without departing from the spirit and scope thereof, it is to be understood that I do not limit myself to the specific embodiments thereof except as defined in the appended claims.

What is claimed is:

1. A continuous process for the production of hexamethylenediamine from distilled crude adiponitrile which comprises, in combination, the steps of:
   (a) contacting the distilled crude adiponitrile continuously in the liquid phase alternately with at least one bed of a strongly acidic cation exchange resin and at least one bed of a strongly basic anion exchange resin;
   (b) regenerating a contacted cation exchange resin bed when the ultraviolet light absorption of the cation exchange resin contacted adiponitrile effluent therefrom has increased substantially two-fold;
   (c) regenerating a contacted anion exchange resin bed when the anion exchange resin bed contacted adiponitrile effluent therefrom contains detectable acid;
   (d) dehydrating and distilling the cation an anion exchange resin bed contacted adiponitrile; and
   (e) hydrogenating the dehydrated, distilled and ion exchange resin bed contacted adiponitrile in the presence of at least liquid ammonia, hydrogen, and a reduced sintered cobalt oxide catalyst at a temperature of 120° C. to 170° C. and a pressure of 4,000 p.s.i. to 6,000 p.s.i.

2. A continuous process for the production of hexamethylenediamine from distilled crude liquid adiponitrile which comprises, in combination, the steps of:
   (a) providing at least two beds of a strongly acidic cation exchange resin and at least two beds of a strongly basic anion exchange resin;
   (b) contacting the said distilled crude adiponitrile continuously in the liquid phase sequentially in any order with at least one bed of a strongly acidic cation exchange resin and at least one bed of a strongly basic anion exchange resin;
   (c) diverting the continuous flow of the said distilled crude adiponitrile to at least one other strongly acidic cation exchange resin bed for contacting therewith when the effluent adiponitrile from said at least one cation exchange resin bed has an ultraviolet light absorption increase of substantially two-fold;
   (d) regenerating said at least one cation exchange resin bed for subsequent contacting with said distilled crude adiponitrile when the effluent adiponitrile from said at least one other cation exchange resin bed has an ultraviolet light absorption increase of substantially two-fold;
   (e) diverting the continuous flow of said distilled crude adiponitrile to at least one other strongly basic anion exchange resin bed for contacting therewith when the effluent adiponitrile from said at least one anion exchange resin bed has detectable acid present;
   (f) regenerating said at least one anion exchange resin bed for subsequent contacting with said distilled crude adiponitrile when the effluent adiponitrile from said at least one other anion exchange resin bed has detectable acid present;
   (g) dehydrating and distilling the cation and anion resin bed contacted adiponitrile; and
   (h) hydrogenating the dehydrated, distilled and ion exchange resin bed contacted adiponitrile in the presence of at least liquid ammonia, hydrogen, and a reduced sintered cobalt oxide catalyst at a temperature of 120° C. to 170° C. and a pressure of 4,000 p.s.i. to 6,000 p.s.i.

3. The process of claim 2 wherein the said ultraviolet light has a wave length of 220 to 280 millimicrons.

4. The process of claim 2 wherein the said ultraviolet light has a wave length of 250 to 270 millimicrons.

5. A continuous process for the production of hexamethylenediamine from distilled crude liquid adiponitrile which comprises, in combination, the steps of:
   (a) providing at least two beds of a strongly acidic cation exchange resin and at least two beds of a strongly basic anion exchange resin;
   (b) contacting the said distilled crude adiponitrile continuously in the liquid phase sequentially in any order with at least one bed of a strongly acidic cation exchange resin and at least one bed of a strongly basic anion exchange resin;
   (c) diverting the continuous flow of the said distilled crude adiponitrile to at least one other strongly acidic cation exchange resin bed for contacting therewith when the effluent adiponitrile from said at least one cation exchange resin bed has an ultraviolet light absorption increase of substantially two-fold;
   (d) regenerating said at least one cation exchange resin bed in preparation for subsequent contacting with said distilled crude adiponitrile when the effluent adiponitrile from said at least one other cation exchange resin bed has an ultraviolet light absorption increase of substantially two-fold;
   (e) regenerating said at least one other cation exchange resin bed in preparation for subsequent contacting with said distilled crude adiponitrile when the effluent adiponitrile from said at least one cation exchange resin bed has an ultraviolet light absorption increase of substantially two-fold;
   (f) diverting the continuous flow of said distilled crude adiponitrile to at least one other strongly basic anion exchange resin bed for contacting therewith when the effluent adiponitrile from said at least one anion exchange resin bed has detectable acid present;
   (g) regenerating said at least one anion exchange resin bed in preparation for subsequent contacting with said distilled crude adiponitrile when the effluent adiponitrile from said at least one other anion exchange resin bed has detectable acid present;
   (h) regenerating said at least one other anion exchange resin bed in preparation for subsequent contacting with said distilled crude adiponitrile when the effluent adiponitrile from said at least one anion exchange resin bed has detectable acid present;

(i) dehydrating and distilling the cation and anion resin bed contacted adiponitrile; and (j) hydrogenating the dehydrated, distilled, and ion exchange resin bed contacted adiponitrile in the presence of at least liquid ammonia, hydrogen, and a reduced sintered cobalt oxide catalyst at a temperature of 120° C. to 170° C. and a pressure of 4,000 p.s.i. to 6,000 p.s.i.

6. The process of claim 5 wherein the said distilled crude adiponitrile is saturated with water.

References Cited in the file of this patent
UNITED STATES PATENTS
3,048,635   Indest et al. _____ Aug. 7, 1962

UNITED STATES PATENT OFFICE
CERTIFICATE OF CORRECTION

Patent No. 3,152,186                        October 6, 1964

Charles R. Campbell et al.

It is hereby certified that error appears in the above numbered patent requiring correction and that the said Letters Patent should read as corrected below.

Column 3, line 73, for "basis" read -- basic --; column 5, line 72, for "3%" read -- 30% --.

Signed and sealed this 30th day of March 1965.

(SEAL)
Attest:

ERNEST W. SWIDER                      EDWARD J. BRENNER
Attesting Officer                        Commissioner of Patents